United States Patent [19]

Hauck et al.

[11] Patent Number: 5,221,136

[45] Date of Patent: Jun. 22, 1993

[54] REFRIGERATOR LINER STRUCTURES

[75] Inventors: Steven M. Hauck, Piscataway; Jeffrey P. Viola, Manalapan, both of N.J.

[73] Assignee: BASF Corporation, Parsippany, N.J.

[21] Appl. No.: 758,641

[22] Filed: Sep. 12, 1991

[51] Int. Cl.$^5$ ............................................. A47B 81/00
[52] U.S. Cl. ..................... 312/406; 220/453; 220/467; 428/314.4; 428/314.8; 428/319.7; 428/515; 428/517; 428/519
[58] Field of Search ............................... 312/401, 406; 62/DIG. 13; 220/453, 464, 467, 468; 428/314.4, 314.8, 319.7, 515, 517, 519

[56] References Cited

U.S. PATENT DOCUMENTS

| | | |
|---|---|---|
| 3,960,631 | 6/1976 | Weiss et al. |
| 4,005,919 | 2/1977 | Hoge et al. ........................ 312/406 |
| 4,196,950 | 4/1980 | Churchill et al. .................. 312/406 |
| 4,707,401 | 11/1987 | Benford ........................ 312/406 X |
| 5,009,952 | 4/1991 | Klepsch et al. ................. 312/406 X |
| 5,118,174 | 6/1992 | Benford et al. .................... 312/406 |

Primary Examiner—Kenneth J. Dorner
Assistant Examiner—Brian K. Green
Attorney, Agent, or Firm—Dennis V. Carmen

[57] ABSTRACT

A refrigerator cabinet is provided with a plastic liner, the inside wall of the refrigerator, which is resistant to chemical degradation by fluorocarbons. Freon and Freon substitutes used as blowing agents for foaming the insulation contained between the outer metal cabinet and the inside wall of the refrigerator can cause blistering, cracking, and sometimes dissolution of materials used to form the plastic liner, which is the inside wall of the refrigerator. There is now provided a plastic liner which is resistant to those blowing agents and particularly to those blowing agents which are partially halogenated and tend to be more aggressive than Freon. The plastic liner wall maintains impact strength and toughness after exposure to fluorohydrocarbons conventionally employed in refrigerator units for in situ polyurethane foam production.

30 Claims, 1 Drawing Sheet

U.S. Patent        June 22, 1993        5,221,136
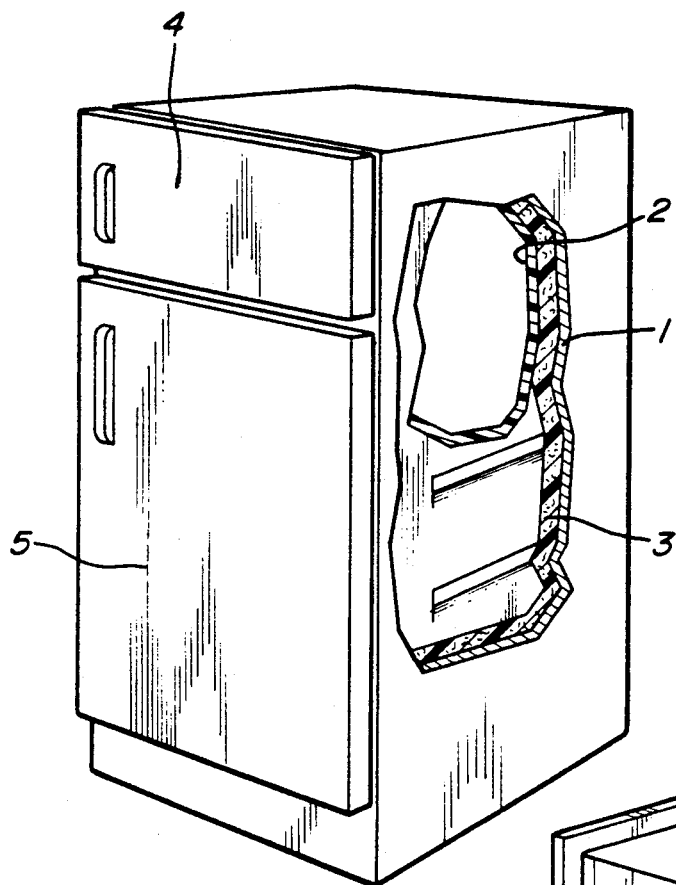
Fig-1
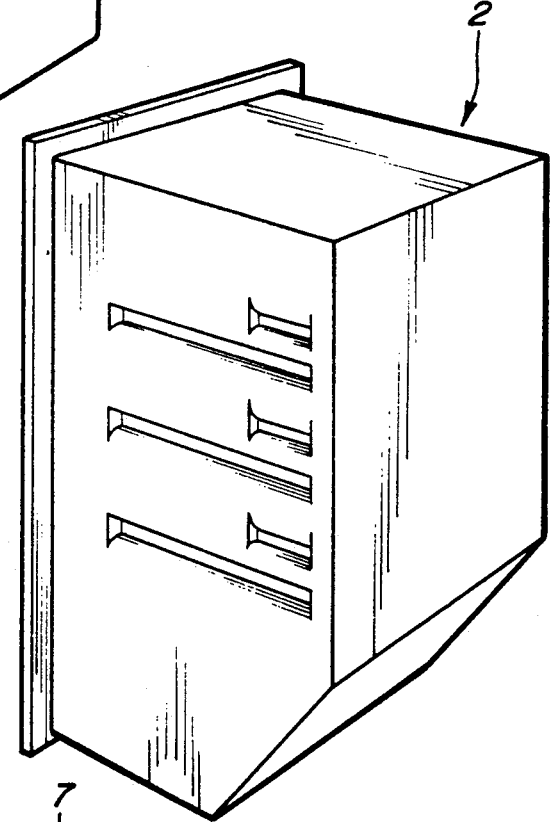
Fig-2
Fig-3
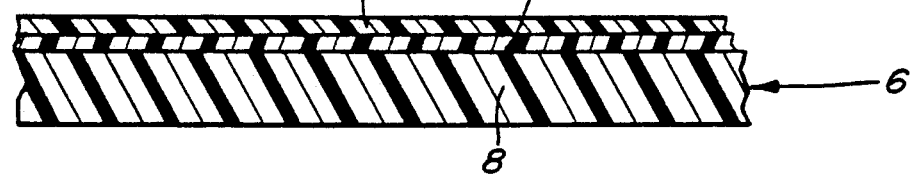

REFRIGERATOR LINER STRUCTURES

FIELD OF THE INVENTION

The invention relates to a refrigerator cabinet appliance, the liner wall of which is resistant to attack by Freon and Freon substitutes.

BACKGROUND OF THE INVENTION

Typical refrigerator appliance cabinets consist of an outer metal cabinet, an inner plastic liner, typically ABS (acrylonitrile-butadiene styrene) or HIPS (high impact polystyrene), and an insulating foam core, typically polyurethane foam. Blowing agents for the polyurethane foam are locked into the foam. Freon, a completely halogenated methane, fluorotrichloro methane, is presently employed commercially as the blowing agent. For environmental reasons, implemented by regulations, substitutes for Freon must be found. Proposed substitutes for Freon are halogenated hydrocarbons which contain at least one hydrogen atom.

Polyurethane blowing agents, such as Freon (CFC-11) and Freon substitutes, such as 2-fluoro-2,2 dichloroethane and 2,2-dichloro-1, 1,1-trifluoroethane,(HCFC 141b and HCFC 123, respectively), can cause liner blistering, catastrophic cracks, tiny cracks (crazing) and loss of impact properties (embrittlement), as well as stress whitening and/or dissolution. The blowing agents HCFC 141b and HCFC 123 appear to be more chemically aggressive than Freon (CFC-11) in attacking the liner. It is the common belief that blowing agent attack of the liner occurs on condensation of the blowing agent to liquid, which occurs on cooling. Cooling and condensation of the blowing agent does occur during shipping and storage. Shipping conditions are simulated during fabrication by cycling the appliance cabinet from hot to cold to cause evaporation and condensation of the blowing agent(s).

It is proposed to provide a plastic sheet structure to be thermoformed into a refrigeration liner that is resistant to chemical attack.

It is an object of the invention to provide a refrigeration appliance liner to be fabricated from a thermoformable, plastic sheet material exhibiting resistance to chemical attack (blistering, cracking, crazing, as mentioned above, by polyurethane foam blown with Freon (CFC-11) or potential Freon substitutes including HCFC-123 and HCFC-141b, which are mentioned above.

It is an object of the invention to provide a refrigeration appliance liner to be fabricated from a thermoformable, plastic sheet material which retains a high level of toughness (impact properties) and strength (tensile properties), even at low temperatures (at 5° F. or less).

It is another object of the invention to provide a liner made from a plastic sheet material that maintains processability similar to HIPS or ABS, including favorable extrusion conditions and similar thermoforming behavior.

It is another object of the invention to provide a liner made from a plastic sheet containing a layer of a special multi-functional blend that exhibits excellent chemical resistance to Freon or potential Freon substitutes, may additionally function as an adhesive layer between optional layers of HIPS (or ABS) and polyolefin, and finally acts as a compatibilizing agent when regrind plastic sheet scrap is recycled to virgin plastics resin being extruded into the core sheet layer.

SUMMARY OF THE INVENTION

In accordance with the invention, a refrigerator appliance is provided with a plastic liner which is substantially chemically inert to Freon and Freon substitutes. A conventional refrigerator appliance cabinet includes an outer metal cabinet, an inner plastic liner comprising ABS (acrylonitrile-butadiene styrene) or HIPS (high impact polystyrene), and an insulating foam core, typically polyurethane foam. Blowing agent for the polyurethane foam is locked into the foam.

The plastic liner serves as the inner plastic wall of the refrigerator. The plastic wall is of variable thickness, as a result of thermoforming during fabrication. However, it is formed of a composite of relatively uniform thickness.

In accordance with the invention, the plastic liner comprises a barrier layer, which is substantially chemically inert to completely halogenated and partially halogenated hydrocarbons, e.g., chlorinated and/or fluorinated hydrocarbons used as blowing agents for polyurethane foam formation. In one embodiment of the invention, a core layer of ABS (acrylonitrile-butadiene-styrene) or HIPS (high impact polystyrene), for example by coextrusion or lamination, is affixed to the barrier layer. For visual attractiveness, a glossy patina on the barrier layer or the core layer may be present either due to the inherent properties of the core layer or by providing an independent layer of material which provides high gloss.

DESCRIPTION OF THE DRAWINGS

FIG. 1 is a schematic drawing of a refrigerator cabinet.

FIG. 2 is a schematic drawing of the plastic liner serving as plastic wall of the refrigerator.

FIG. 3 is a fragmentary cross section of the composite forming the plastic liner.

DETAILED DESCRIPTION OF THE INVENTION

The invention will be explained with reference to the appended drawings.

The refrigerator appliance, of FIG. 1, includes a cabinet and is defined by an outer cabinet metal wall 1, and inner liner wall 2, and a body of foamed-in-place insulation 3 there between. In one popular design, the cabinet may define a freezer space 4 and an above-freezing refrigeration space 5.

Inner liner wall 2 is thermoformed into the desired configuration, as shown in FIG. 2. Inner liner wall 2 is a thermoformed product of liner sheet 6, one embodiment of which is illustrated in FIG. 3 as a multi lamina composite. After being thermoformed into the desired configuration, the inner liner wall 2 is disposed into the outer cabinet wall 1 in a nested, spaced relationship for introduction of the foamed insulation by a conventional foaming in place operation. Usually the outer cabinet wall 1 and the inner liner wall 2 are joined physically by mating of joints.

The barrier layer of the invention is substantially chemically inert to halogenated hydrocarbon(s) used as blowing agents in polyurethane foam production. If a core layer is employed, it is disposed on a surface of the core layer. During polyurethane in situ foam production, in one embodiment of the invention, it is the surface of the barrier layer of the composite which is contiguous to and bonds with the foam. However, it is not essential that the barrier layer of the invention be contiguous to the foam. In FIG. 3 the barrier layer is illustrated as numeral 8.

The barrier layer comprises 4 to 50% by weight of a composite which includes a core layer and comprises polymers or copolymers of ethylene or propylene which are selected from the group consisting of polypropylene, low density polyethylene, linear low density polyethylene, high density polyethylene (melt index of 1 to 10 and density of 0.935 to 0.960), high molecular weight high density polyethylene (melt index of 0.05 to 1.0), ethylene vinyl alcohol, certain high impact polystyrenes, nylon 66, and PVC. The barrier layer may comprise one or more lamina of the same or different polymer or copolymer.

The barrier layer may, and preferably does, contain 4 to 30 weight percent of synthetic block copolymer rubber. The synthetic block copolymer rubber can be selected from styrene-butadiene diblock; styrene-ethylene/butylene-styrene triblock; styrene-ethylene/butylene-styrene triblock functionalized with maleic anhydride, maleic acid or admixtures thereof, or combinations of any of the above.

The liner sheet may be formed of ABS (acrylonitrile-butadiene-styrene) or HIPS (high impact polystyrene) core layer which constitutes the major proportion of the composite. The core layer comprises 50 to 96 weight percent of the composite. Those core materials are chemically degradable by the completely or partially halogenated hydrocarbon blowing agent, used in the polyurethane foam production. Both of these core materials are commercially available. In FIG. 3 the core layer, chemically degradable by the fluorinated hydrocarbon, is designated as 7.

The core layer which is (1) high impact polystyrene or (2) acrylonitrile-butadiene-styrene copolymer, contains 5 to 35, preferably 5 to 20, and usually 5 to 15 weight percent rubber in the form of particles. The rubber is usually polybutadiene and can be a styrene-butadiene copolymer. The rubber particles can have average diameters of at least 5 microns, and generally of at least 6 microns average diameters and up to 10 microns. When the rubber particles are 1 micron or less, as described in U.S. Pat. No. 4,513,120 high gloss polystyrene (medium impact) is produced. U.S. Pat. No. 4,513,120 is incorporated by reference herein.

Various alternatives are available for maximizing the adhesion of the core material to the barrier layer. Moreover, these alternatives can improve adhesion of the foam insulation to the barrier material. The core layer may be subjected to corona discharge treatment, or to ultraviolet light exposure, and by methods known in the art. In accordance with one embodiment of the invention, maximizing the adhesion of the the barrier layer to the foam and optionally to a core layer appears to be achieved chemically. In a preferred embodiment the material of the barrier layer contains maleic anhydride, maleic acid, and/or derivatives of maleic acid in an amount ranging from 0.1 to 10 weight percent of the barrier material. Conveniently, this can be achieved by inclusion of styrene-ethylene/butylene-styrene triblock functionalized with maleic anhydride, maleic acid or admixtures thereof; the triblock material is available from Shell Chemical Company as Kraton FG-1901X.

In one embodiment of the invention, the composite is formed with a barrier layer disposed on one surface of the core layer with a third layer of medium impact high gloss polystyrene on the exposed surface of the core layer. The third layer of medium impact high gloss polystyrene comprises 0.5 to 8 weight percent of the composite. The third layer is depicted in FIG. 3 as element 9.

The composite is formed by the coextrusion of the materials of the laminae described above. The composite sheet can then be cut into suitable lengths for thermoforming into any desired configuration, one of which is illustrated by FIG. 2. The resulting liner wall 2 is then assembled with the outer cabinet wall 1 and in situ foaming of the insulation material is performed. The resulting structure exhibits impact strength, and substantial elimination of thermal cracking and of blistering.

In situ foaming involves admixing an isocyanate with a masterbatch. The masterbatch comprises 60 to 70 percent of a polyol; 0.3 to 1.5 percent of a surfactant; 0.5 to 3.0 percent of a catalyst 0.4 to 2.5 percent of water and 12 to 30 percent of the blowing agent. The isocyanates used in applicances include TDI and PMDI. TDI comprises an 80:20 mixture of 2,4 and 2,6 isomers of products produced by dinitration of toluene, catalytic hydrogenation to the diamines, and phosgenation. Cf. Kirk Othmer, ENCYCLOPEDIA OF CHEMICAL TECHNOLOGY, Vol. 23, page 581 (Third Edition). PMDI is the reaction product formed by nitration of benzene and reduction to produce aniline; reacting aniline with formaldehyde in the presence of hydrochloric acid to produce a mixture of oligomeric amines, which are phosgenated to yield PMDI. Cf. Kirk Othmer, ENCYCLOPEDIA OF CHEMICAL TECHNOLOGY, Vol. 23, page 581 (Third Edition). The blowing agent can be Freon or Freon substitutes which are partially halogenated lower hydrocarbon of 1 to 5 carbon atoms, usually of 2 to 4 carbon atoms; halogenated includes fluorinated and/or chlorinated. By "partially halogenated" is meant that the Freon substitutes of the invention preferably contains at least one hydrogen atom. Illustrative of the partially halogenated lower hydrocarbon are 1,1-dichloro-1-fluoroethane and 2,2-dichloro-1,1,1-trifluoroethane, chlorodifluoromethane (HCFC 22); 1,1,1,2-tetrafluoro-2-chloro-ethane (HCFC 124); 1,1,1,2-tetrafluoroethane (HFC 134a) and pentafluoroethane (HFC 125). The foams produced contain in their cellular structure residual amounts of the blowing agent. The foam is formed in situ by foaming in a high pressure mixhead equipped to a nozzle for introducing the foam and foaming components into the cavity formed by the nesting of outer metal cabinet 1 and the plastic liner.

EXAMPLES

Examples 1

Plastic sheets of composition described in the Table 1 were fabricated into test plaques (15"×15"×0.050") and Brett-type test panels (78¾"×7 7/8"×0.050"). These test sheets were then positioned as pairs into closed foaming jigs with a 2" space between the sheets. Polyurethane foam chemicals were then introduced into the jigs to fill the space between the plastic sheets, to produce plastic/foam/plastic composite structures. These composite structures were thermally cycled several times between −20° F. and 140° F., to cause condensation and vaporization of liquid blowing agent along the exposed plastic sheet surfaces.

Several blowing agents (CFC-11, and HCFC-123,) at several levels (9-15%) were evaluated in separate tests. CFC-11 is trichlorofluoromethane ($CCl_3F$): HCFC-123 is 2,2dichloro-1,1,1,-trifluoroethane, HCFC-141b is 1,1-dichloro-1-fluroethane ($CHCl_2CF_3$);

The thermally cycled composite structures were then tested, as summarized in Table 1, and inspected for signs of chemical attack.

TABLE 1

POLYSTYRENE/POLYOLEFIN BLENDS
MIS-ESCR AND PHYSICAL PROPERTIES

|  | MOBIL PS7100 | BLEND 1 | BLEND 2 | BLEND 3 | BLEND 4 | BLEND 5 | BLEND 6 |
|---|---|---|---|---|---|---|---|
| Composition (%) | | | | | | | |
| HIPS/PS, % | 100 | 80 | 80 | 80 | 80 | 80 | 80 |
| Polyolefin, % | 0 | 10 | 10 | 10 | 10 | 10 | 10 |
| Compatibilizer, % | 0 | 10 | 10 | 10 | 10 | 10 | 10 |
| HIPS/PS, Type | 7100 | 7100 | 7100 | 7100 |  | 7100 | 7100 |
| Polyolefin, Type |  | Hilmont 6231 | Aristech FF-028N | Himont SA-747M | Mobil HMA-045 | Mobil MMA-169 | Himont SA-747M |
| Compatibilizer, Type |  | Homo PP G1657 S-EB-S | Homo PP G1657 S-EB-S | Rand PP G1657 S-EB-S | HDPE G1657 S-EB-S | LLDPE G1657 S-EB-S | Rand PP 50:50 1657:1901 |
| MIS-ESCR, 1000 psi (min) | | | | | | | |
| Chiffon | 63 | 138 | 394 | 125 | 63 | 2 | 600 |
| COOA | 115 | 441 | 1186 | 491 | 256 | 4 | 5963 |
| CFC-11 | 9 | 7 | 9 | 8 | 6 | 0 | 12 |
| HCFC-123 | 5 | 4 | 14 | 10 | 2 | 0 | 14 |
| HCFC-141b | 6 | 8 | 13 | 10 | 6 | 0 | 17 |
| MIS-ESCR, 400 psi (min) | | | | | | | |
| CFC-11 | 22 |  |  | 37 |  |  |  |
| HCFC-123 | 13 |  |  | 65 |  |  |  |
| HCFC-141b | 23 |  |  | 51 |  |  |  |
| Physical Properties: | | | | | | | |
| MFI (G), g/10 min | 2.9 | 9.3 | 6.8 | 8.2 | 8.7 | 12.1 | 5.8 |
| Vicat, C | 103 | 103 | 103 | 101 | 100 | 92 | 101 |
| Tensile Yield, psi | 2500 | 2200 | 2500 | 2100 | 2100 | 1600 | 2600 |
| Tensile Fail, psi | 3500 | 2200 | 2500 | 2100 | 2100 | 1600 | 2600 |
| Tensile Modulus, psi | 182,000 | 97,000 | 109,000 | 99,000 | 96,000 | 58,000 | 112,000 |
| Elongation, % | 41 | 31 | 41 | 31 | 29 | 28 | 40 |
| Izod Impact, ft.lb/in | 2.1C | 1.0C | 1.4C | 1.2C | 1.1C | 1.1C | 1.5C |
| Gardner Impact, in.lb | 123 | 49 | 95 | 69 | 18 | 6 | 93 |

|  | BLEND 7 | BLEND 8 | BLEND 9 | BLEND 10 | BLEND 11 | BLEND 12 |
|---|---|---|---|---|---|---|
| Composition (%) | | | | | | |
| HIPS/PS, % | 80 | 85 | 80 | 80 | 70 | 60 |
| Polyolefin, % | 10 | 10 | 10 | 10 | 20 | 30 |
| Compatibilizer, % | 10 | 10 | 10 | 10 | 10 | 10 |
| HIPS/PS, Type | 7100 | 7100 | 7100 | 7100 | 7100 | 7100 |
| Polyolefin, Type | Himont SA-747M | Hilmont SA-747M | Himont SA-747M | OxyChem L5005 | OxyChem L5005 | OxyChem L5005 |
|  | Rand PP | Rand PP | Rand PP | HMW-HDPE | HMW-HDPE | HMW-HDPE |
| Compatibilizer, Type | FG1901X SEBS/MA | G1702 S-EP | G1702 S-EP | FG1901X SEBS/MA | FG1901X SEBS/MA | FG1901X SEBS/MA |
| MIS-ESCR, 1000 psi (min) | | | | | | |
| Chiffon | 630 | 147 | 90 | 342 | 753 | 1700 |
| COOA | 1708 | 7026 | 4995 |  |  |  |
| CFC-11 | 14 | 7 | 5 | 8 | 13 | 25 |
| HCFC-123 | 20 | 4 | 3 |  |  |  |
| HCFC-141b | 18 | 5 | 4 |  |  |  |
| MIS-ESCR, 400 psi (min) | | | | | | |
| CFC-11 | 44 |  |  | 41 | 48 | 80 |
| HCFC-123 | 69 |  |  | 56 | 74 | 142 |
| HCFC-141b | 60 |  |  | 48 | 63 | 115 |
| Physical Properties: | | | | | | |
| MFI (G), g/10 min | 5.7 | 2.8 | 2.7 | 3.5 | 2.9 | 2.2 |
| Vicat, C | 101 | 101 | 101 | 100 | 101 | 102 |
| Tensile Yield, psi | 2800 | 2400 | 2400 | 3000 | 3070 | 3020 |
| Tensile Fail, psi | 2800 | 2400 | 2400 | 3000 | 3070 | 3020 |
| Tensile Modulus, psi | 116,000 | 152,000 | 145,000 | 138,000 | 130,000 | 124,000 |
| Elongation, % | 40 | 12 | 7 | 50 | 46 | 36 |
| Izod Impact, ft.lb/in | 1.6H | 2.1C | 2.1C | 2.1C | 2.0C | 1.8C |
| Gardner Impact, in.lb | 99 | 66 | 66 | 121 | 127 | 109 |

|  | BLEND 13 | BLEND 14 | BLEND 15 | BLEND 16 | BLEND 17 | BLEND 18 |
|---|---|---|---|---|---|---|
| Composition (%) | | | | | | |
| HIPS/PS, % | 50 | 60 | 60 | 60 | 60 | 60 |
| Polyolefin, % | 40 | 30 | 30 | 30 | 30 | 30 |
| Compatibilizer, % | 10 | 10 | 10 | 10 | 10 | 10 |
| HIPS/PS, Type | 7100 | 7100 | 7100 | 7100 | 7100 | 7100 |
| Polyolefin, Type | OxyChem L5005 | OxyChem L5005 | Himont SA-747M | Himont SA-747M | Chevron PE5280T | Chevron PE5280T |

TABLE 1-continued

POLYSTYRENE/POLYOLEFIN BLENDS
MIS-ESCR AND PHYSICAL PROPERTIES

| Compatibilizer, Type | HMW-HDPE FG1901X SEBS/MA | HMW-HDPE G1657 S-EB-S | Rand PP G1657 S-EB-S | Rand PP FG1901X SEBS/MA | PE/EVA 8% FG1901X SEBS/MA | PE/EVA 8% G1657 S-EB-S |
|---|---|---|---|---|---|---|
| MIS-ESCR, 1000 psi (min) | | | | | | |
| Chiffon | 2887 | 37 | 22 | 914 | >10000 | |
| COOA | | | | | (400 psi) | |
| CFC-11 | 31 | 3 | 4 | 16 | | |
| HCFC-123 | | | | | | |
| HCFC-141b | | | | | | |
| MIS-ESCR, 400 psi (min) | | | | | | |
| CFC-11 | 130 | 51 | 48 | 88 | 75 | 68 |
| HCFC-123 | 270 | 93 | 146 | 230 | 150 | 160 |
| HCFC-141b | 218 | 73 | 88 | 159 | 105 | 103 |
| Physical Properties: | | | | | | |
| MFI (G), g/10 min | 1.8 | 3.6 | 11.1 | 6.3 | 4.6 | 6.1 |
| Vicat, C | 103 | 99 | 101 | 103 | 88 | 77 |
| Tensile Yield, psi | 2940 | 2500 | 2200 | 2790 | 2520 | 2000 |
| Tensile Fail, psi | 2940 | 2500 | 2040 | 2770 | 2520 | 2000 |
| Tensile Modulus, psi | 118,000 | 106,000 | 79,000 | 101,000 | 84,000 | 65,000 |
| Elongation, % | 33 | 34 | 39 | 36 | 54 | 42 |
| Izod Impact, ft.lb/in | 1.5H | 1.4C | 1.0C | 1.4C | 2.6H | 2.1H |
| Gardner Impact, in.lb | 55 | 100 | 136 | 154 | 242 | 215 |

| | BLEND 19 | BLEND 20 | BLEND 21 | BLEND 22 | BLEND 23 | BLEND 24 |
|---|---|---|---|---|---|---|
| Composition (%) | | | | | | |
| HIPS/PS, % | 60 | 50 | 50 | 40 | 40 | 60 |
| Polyolefin, % | 30 | 40 | 40 | 50 | 50 | 30 |
| Compatibilizer, % | 10 | 10 | 10 | 10 | 10 | 10 |
| HIPS/PS, Type | 7100 | 9524 | 7800 | 7800 | 1800 | 1800 |
| Polyolefin, Type | Chevron PE5272 PE/EVA 4% | OxyChem L5005 HMW-HDPE | OxyChem L5005 HMW-HDPE | OxyChem L5005 HMW-HDPE | OxyChem L5005 HMW-HDPE | Mobil HYA-301 HDPE |
| Compatibilizer, Type | G1657 S-EB-S | G1657 S-EB-S | G1657 S-EB-S | FG1901X SEBS/MA | FG1901X SEBS/MA | FG1901X SEBS/MA |
| MIS-ESCR, 1000 psi (min) | | | | | | |
| Chiffon | | >1000 | >1000 | >1000 | >1000 | 223 |
| COOA | | (400 psi) | (400 psi) | | | |
| CFC-11 | | | | | | |
| HCFC-123 | | | | | | |
| HCFC-141b | | | | | | |
| MIS-ESCR, 400 psi (min) | | | | | | |
| CFC-11 | 53 | 96 | 88 | 311 | 346 | 62 |
| HCFC-123 | 126 | 197 | 170 | 642 | 627 | 76 |
| HCFC-141b | 74 | 135 | 108 | >1000 | 495 | 87 |
| Physical Properties: | | | | | | |
| MFI (G), g/10 min | 7.7 | 1.9 | 1.7 | 1.8 | 1.6 | 4.7 |
| Vicat, C | 103 | 104 | 104 | 106 | 109 | 106 |
| Tensile Yield, psi | 1930 | 2500 | 2500 | 2790 | 3890 | 5160 |
| Tensile Fail, psi | 1930 | 2000 | 2300 | 2830 | 3460 | 5160 |
| Tensile Modulus, psi | 61,000 | 102,000 | 103,000 | 122,000 | 174,000 | 229,000 |
| Elongation, % | 42 | 46 | 48 | 82 | 23 | 5 |
| Izod Impact, ft.lb/in | 1.9H | 1.9C | 1.7C | 1.7C | 0.8C | 1.1H |
| Gardner Impact, in.lb | 240 | 104 | 89 | 67 | 14 | 38 |

| | BLEND 25 | BLEND 26 | BLEND 27 | BLEND 28 | BLEND 29 |
|---|---|---|---|---|---|
| Composition (%) | | | | | |
| HIPS/PS, % | 60 | 60 | 50 | 0 | 20 |
| Polyolefin, % | 30 | 30 | 40 | 80 | 65 |
| Compatibilizer, % | 10 | 10 | 10 | 20 | 15 |
| HIPS/PS, Type | 1800 | 7800 | 7100 | 7100 | 7100 |
| Polyolefin, Type | Mobil HCX-002 HDPE | OxyChem L5005 HMW-HDPE | Mobil HMX-034 HDPE | Mobil HMX-034 HDPE | Mobil HMX-034 HDPE |
| Compatibilizer, Type | FG1901X SEBS/MA | FG1901X SEBS/MA | FG1901X SEBS/MA | FG1901X SEBS/MA | FG1901X SEBS/MA |
| MIS-ESCR, 1000 psi (min) | | | | | |
| Chiffon | >1000 | 734 | >1000 | >1000 | >1000 |
| COOA | | | | | |
| CFC-11 | | | | | |
| HCFC-123 | | | | | |
| HCFC-141b | | | | | |
| MIS-ESCR, 400 psi (min) | | | | | |
| CFC-11 | 679 | 83 | 351 | >1000 | >1000 |
| HCFC-123 | 523 | 120 | 630 | >1000 | >1000 |
| HCFC-141b | 496 | 97 | 544 | >1000 | >1000 |
| Physical Properties: | | | | | |
| MFI (G), g/10 min | 9.4 | 3.7 | 9.3 | 9.8 | 10.8 |

TABLE 1-continued
POLYSTYRENE/POLYOLEFIN BLENDS
MIS-ESCR AND PHYSICAL PROPERTIES

| | | | | | |
|---|---|---|---|---|---|
| Vicat, C | 103 | 103 | 105 | 115 | 108 |
| Tensile Yield, psi | 4140 | 2950 | 2890 | 1830 | 2170 |
| Tensile Fail, psi | 4140 | 2950 | 2890 | 1830 | 2170 |
| Tensile Modulus, psi | 192,000 | 151,000 | 126,000 | 58,000 | 71,000 |
| Elongation, % | 15 | 121 | 18 | 500 | 477 |
| Izod Impact, ft.lb/in | 0.7H | 4.3H | 0.6C | 13.8 | 1.4C |
| Gardner Impact, in.lb | 44 | 207 | 48 | >320 | 294 |

*high impact polystyrene
**polystyrene

Example 2

Sheets of several different compositions described in Table 2 invention were exposed to the liquid blowing agents by sealing a glass ball joint to the sheet samples and adding the specific liquid blowing agent being evaluated (CFC-11, HCFC-123, and HCFC-141b).

The samples were exposed to the blowing agents for thirty minutes each, then exposed to heat (60° C. for 30 minutes) to drive off the blowing agents, and finally inspected for chemical attack. Several sheet samples displayed no signs of chemical attack at all, and most samples showed at least some reduction in chemical attack when compared to sheets of HIPS or ABS. The results are set forth in Table 2.

TABLE 2
LIQUID BLOWING AGENT CONTACT STUDY

| | CFC-11 | HCFC-123 | HCFC-141b |
|---|---|---|---|
| UNMODIFIED RESINS: | | | |
| Mobil PS7100 HIPS | Severe Blistering | Severe Blistering | Severe Blistering |
| Mobil PS7800 MIPS | Severe Blistering | Severe Blistering | Severe Blistering |
| Mobil PS5350 HIPS | Severe Blistering | Severe Blistering | Severe Blistering |
| Dow 469 HIPS | Severe Blistering | Severe Blistering | Severe Blistering |
| Monsanto ABS | Unaffected | Cracking Severe Blistering | Cracking No Blistering |
| PS/POLYOLEFIN BLENDS COEX. ON PS7100: | | | |
| CA10 (10% Random PP) | Severe Blistering | Severe Blistering | Severe Blistering |
| CB30 (30% Random PP) | Moderate Blistering | Moderate Blistering | Moderate Blistering |
| LB40 (40% HMW-HDPE) | Skin Delamination Moderate Blistering | Skin Delamination No Blistering | Skin Delamination No Blistering |
| BASF KR2773 (30% HDPE) (10% CaCO3 filled) | Skin Delamination No Blistering | Slim Delamination Slight Blistering | Skin Delamination Slight Blistering |
| BASF KR2774 (30% LDPE) | Severe Blistering | Moderate Blistering | Moderate Blistering |
| BARRIER FILMS LAMINATED ON PS7100: | | | |
| Mobil MMA-169 LLDPE (2 mil) | Moderate Blistering | Unaffected | Unaffected |
| Mobil HMA-045 HDPE (2 mil) | Unaffected | Unaffected | Unaffected |
| Oxy L5005 HMW-HDPE (2 mil) | Unaffected | Unaffected | Unaffected |
| DuPont EVOH (5 mil) | Unaffected | Unaffected | Unaffected |

Example 3

The invention is illustrated by use in a top mount (freezer on top) refrigerator at 15 ft$^3$ capacity, with HCFC-123 as the polyurethane blowing agent at an estimated 18% level weight.

The layers of the composite are described below.

| Pre-Thermoformed Sheet: | |
|---|---|
| Sheet Total Thickness | 202 mil (0.202") |
| Barrier Layer Thickness | 10 mil (0.010") |
| Core Layer Thickness | 190 mil (0.190") |
| Gloss Layer Thickness | 2 mil (0.002") |
| Barrier Layer % of Total sheet | 5% |
| Pre-Thermoformed Sheet Dimensions | (77.75 × 46.75 × 0.202) inches |
| Barrier Layer Material* | |
| Core Layer Material | Mobil ES7100 Refrigeration Grade HIPS |
| Gloss Layer Material | Mobil ES7800 Medium Impact, High Gloss PS |

*Barrier Material used had the following:

| | |
|---|---|
| High Density Polyethylene Type | Mobil HMX-034 HDPE (Melt Flow = 4.0, Density = 0.954) |
| Rubber Type | Shell Chemical Co. Kraton FG-1901X Styrene-Ethylene/Butylene-Styrene Tri-block (functionalized with 2% maleic anhydride) |
| with | |
| Polyethylene Level | 80%, |
| Rubber Level | 20%, and |
| Irganox 1010 Antioxidant | 500 ppm |

The barrier layer material was compounded in a Werner & Pfleiderer ZSK30 mm twin screw extruder, at a temperature profile which ranged from 225° to 400° F.

The composite was formed from a two-layer system including the core layer (ES7100) and the barrier layer, which were coextruded. The gloss layer of medium impact polystyrene (Mobil ES7800) was laminated thereto. The temperature profile for coextrusion is set forth below:

| Coextrusion Temperature Profile: | |
|---|---|
| ES 7100 Extruder | Profile (345-380-350-300-390-400)° F. Die 415° F. Melt Temp 440° F. |
| Barrier Material Extruder | Profile (275-300-325-330)° F. Die 415° F. Melt Temp 340° F. |

The thermoformed product assembled in a metal cabinet with subsequent in situ insulation formation was subjected to 12 temperature cycles ranging from −40° F. to +150° F. Polyurethane foam adhesion to the barrier layer was good and better than the adhesion of barrier layer to the core material. The liner wall exhibited satisfactory impact strength, no signs of cracking during thermal blistering and de minimis blistering.

Example 4

A 22 ft³ refrigerator, a side-by-side model (configuration of refrigerator and freezer compartments) was fitted with a liner and then insulated with polyurethane foam produced by CFC-11 blowing agent at an estimated 16 weight % level.

The compositions, and dimensions, of the preformed sheet components are described below.

| | |
|---|---|
| Sheet Total Thickness | 198 mil (0.198") |
| Barrier Layer Thickness | 6 mil (0.006") |
| Glue/Compat. Layer Thickness | 2 mil (0.002") |
| Core Layer Thickness | 188 mil (0.188") |
| Gloss Layer Thickness | 2 mil (0.002") |
| Glue + Barrier Layers % of sheet | 5% |
| Pre-Thermoformed Sheet Dimensions | (78.75 × 36.00 × 0.198) inches |
| Barrier Layer Material* | Mobil HMX-034 HDPE |
| Glue/Compatibilizer Layer** | Mobil Developmental LB40 |
| Core Layer Material | Mobil ES7100 Refrigeration Grade HIPS |
| Gloss Layer Material | Mobil ES7800 Medium Impact, High Gloss PS |
| *Barrier Layer-Material used | Mobil HMX-034 HDPE (High Density Polyethylene) (Melt Flow = 4.0, Density = 0.954) |
| **Glue/Compat Layer Composition: | |
| Polyethylene Type | OxyChem Alathon L5005 HMW-HDPE (Melt Flow = 0.055 Cond. F. Density = 0.95) |
| Rubber Type | Shell Chemical Co. Kraton FG-1901X Styrene-Ethylene/Butylene-Styrene Tri-block (functionalized with 2% maleic anhydride) |
| HIPS Type | Mobil ES7100 Refrigeration Grade (Melt Flow = 2.5) |
| Polyethylene Level | 40% |
| Rubber Level | 10% |
| HIPS Level | 50% |

The glue/compatabilizer layer materials were compounded in a Werner Pfleiderer 30 mm twin screw extruder at a temperature profile ranging from 225° F. to 450° F. The ES7800 gloss layer was laminated to the remaining laminate which were coextruded in a Welex Coextrusion System.

The unit (s) were subjected 12 times to a temperature cycle of −40° to 150° F. The unit exhibited satisfactory impact strength, and de minimis blistering.

Thus it is apparent that there has been provided in accordance with the invention, a refrigerator plastic liner wall that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A refrigerator appliance cabinet which comprises an outer metal cabinet and an inner plastic liner, the improvement comprising a plastic liner molded from a thermoformable composite which comprises:

a core layer which is (1) high impact polystyrene or (2) acrylonitrilebutadient-styrene copolymer, said core layer containing 5 to 35 weight percent rubber in the form of particles having average diameters of at least 5 microns, said core layer having two surfaces;

wherein the core layer comprises at least 50 weight percent of the composite, a gloss patina on a first of said two surfaces, a barrier material on a second of said two surfaces of said core layer, said barrier material comprising a polymer or copolymer of ethylene or propylene containing 0 to 40% of a block copolymer rubber, based upon the weight of the barrier material, said barrier material comprising 4 to 50% by weight of the composite.

2. The refrigerator appliance cabinet of claim 1, wherein the barrier material contains maleic acid, and/or derivatives of maleic acid in an amount ranging from 0.5 to 10 weight percent of the barrier material.

3. The refrigerator appliance cabinet of claim 1, wherein the polymer of copolymer of ethylene or propylene is selected from the group consisting of polypropylene, low density polyethylene, linear low density polyethylene, high density polyethylene, high molecular weight high density polyethylene.

4. The refrigerator appliance cabinet of claim 3, wherein the rubber is styrene-butadiene diblock; styrene-ethylene/butylene-styrene triblock; styrene-ethylene/butylene-styrene triblock functionalized with maleic anhydride, maleic acid or admixtures thereof.

5. The refrigerator appliance cabinet of claim 4, wherein the barrier material contains maleic anhydride, maleic acid, and/ or derivatives of maleic acid in an amount ranging from 0.5 to 10 weight percent of the barrier material.

6. The refrigerator appliance cabinet of claim 5, wherein the gloss patina is provided by a layer of medium impact, high gloss polystyrene comprising 0.5 to 8 weight percent of the composite.

7. The refrigerator appliance cabinet of claim 6, wherein the core layer comprises 50 to 96 weight percent of said composite.

8. The refrigerator appliance cabinet of claim 7, wherein the core layer comprises at least 55 weight percent of said composite.

9. The refrigerator appliance cabinet of claim 8, wherein the barrier material comprises high density polyethylene.

10. The refrigerator appliance cabinet of claim 9, wherein the barrier material further includes at least 5 weight percent of said block copolymer rubber based on the weight of the barrier material.

11. The refrigerator appliance cabinet of claim 10, wherein the rubber is functionalized with maleic anhydride, maleic acid or derivatives of maleic acid.

12. A refrigerator appliance cabinet which comprises an outer metal cabinet, an inner plastic liner, and a polyurethane foam disposed between said outer metal cabinet and liner, wherein said foam contains a fluorinated hydrocarbon blowing agent and said liner is chemically degradable by the fluorinated hydrocarbon blowing agent, the improvement comprising:

a plastic liner molded from a thermoformable composite which comprises a core layer which is (1) high impact polystyrene or (2) acrylonitrilebutadiene-styrene copolymer, said core layer containing 5 to 35 weight percent rubber, based on the weight of the core layer, in the form of particles having average diameters of at least 5 microns, said core layer having two surfaces;

wherein the core layer comprises at least 50 weight percent of the composite, a gloss patina on a first of said two surfaces, which comprises less than 10 weight percent of the composite;

a barrier material on a second of said two surfaces of said core layer, said barrier material comprising a polymer or copolymer of ethylene or propylene containing 0 to 40 weight percent of a block copolymer rubber, based on the weight of the barrier material, said barrier material comprising 4 to 50% by weight of the composite and is selected from the group consisting of polypropylene, low density polyethylene, linear low density polyethylene, high density polyethylene, high molecular weight high density polyethylene.

13. The refrigerator appliance cabinet of claim 12, wherein the barrier material contains maleic acid, and/or derivatives of maleic acid in an amount ranging from 0.5 to 10 weight percent of the barrier material.

14. The refrigerator appliance cabinet of claim 12, wherein the rubber is styrene-butadiene diblock; styrene-ethylene/butylene-styrene triblock; styrene-ethylene/butylene-styrene triblock functionalized with maleic anhydride, maleic acid or admixtures thereof.

15. The refrigerator appliance cabinet of claim 14, wherein the barrier material contains maleic acid, and/or derivatives of maleic acid in an amount ranging from 0.5 to 10 weight percent of the barrier material.

16. The refrigerator appliance cabinet of claim 15, wherein the patina comprises a layer of medium impact, high gloss polystyrene comprising 0.5 to 8 weight percent of the composite.

17. The refrigerator appliance cabinet of claim 16, wherein the barrier material comprises high density polyethylene.

18. The refrigerator appliance cabinet of claim 17, wherein the barrier material further includes at least 5 weight percent of said block copolymer rubber based on the weight of the barrier material.

19. The refrigerator appliance cabinet of claim 18, wherein the rubber is functionalized with maleic acid or derivatives of maleic acid.

20. A thermoformable composite comprising a core layer which is (1) high impact polystyrene or (2) acrylonitrile-butadiene-styrene copolymer, said core layer containing 5 to 35 weight percent rubber, based on the weight of the core layer, in the form of particles having average diameters of at least 5 microns, said core layer having two surfaces;

wherein the core layer comprises at least 50 weight percent of the composite, a high gloss layer on one of said two surfaces comprising less than 10 weight percent of the composite;

a barrier material on said core layer, said barrier material comprises a polymer or copolymer of ethylene or propylene containing 0 to 40% of a block copolymer rubber, said barrier material comprising 4 to 50% by weight of the composite.

21. The composite of claim 20, wherein the the barrier material contains maleic acid, and/or derivatives of maleic acid in an amount ranging from 0.5 to 10 weight percent of the barrier material.

22. The composite of claim 20, wherein the polymer or copolymer of ethylene or propylene is selected from the group consisting of polypropylene, low density polyethylene, linear low density polyethylene, high density polyethylene, high molecular weight high density polyethylene.

23. The composite of claim 22, wherein the rubber is styrene-butadiene diblock; styrene-ethylene/butylene-styrene triblock; styrene-ethylene/butylene-styrene triblock functionalized with maleic anhydride, maleic acid or admixtures thereof.

24. The composite of claim 23, wherein the barrier material contains maleic anhydride maleic acid, and/or derivatives of either maleic acid or maleic anhydride in an amount ranging from 0.5 to 10 weight percent of the barrier material.

25. The composite of claim 24, wherein the high gloss layer is medium impact, high gloss polystyrene, and wherein the high gloss layer comprises 0.5 to 8 weight percent of the composite.

26. The composite of claim 25, wherein the core layer comprises at least 30 weight percent of said composite.

27. The composite of claim 26, wherein the core layer comprises 50 to 96 weight percent of said composite.

28. The composite of claim 27, wherein the barrier material comprises high density polyethylene.

29. The composite of claim 28, wherein the barrier material further includes at least 5 weight percent of said block copolymer rubber based on the weight of the barrier material.

30. The composite of claim 29, wherein the rubber is functionalized with maleic acid or derivatives of maleic acid.

* * * * *